(12) United States Patent
Fukui et al.

(10) Patent No.: US 10,101,551 B2
(45) Date of Patent: Oct. 16, 2018

(54) MULTI-CORE/SINGLE-CORE CONVERSION MODULE AND MULTI-CORE/SINGLE-CORE CONVERSION APPARATUS

(71) Applicants: SEI Optifrontier Co., Ltd., Yokohama-shi, Kanagawa (JP); SUMITOMO ELECTRIC INDUSTRIES, LTD., Osaka-shi, Osaka (JP)

(72) Inventors: Junji Fukui, Yokohama (JP); Kenichiro Ohtsuka, Yokohama (JP); Yuji Suzuki, Yokohama (JP); Hiroyasu Toyooka, Yokohama (JP); Takayuki Suzuki, Yokohama (JP)

(73) Assignees: SEI OPTIFRONTIER CO., LTD., Yokohama-shi, Kanagawa (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/613,368

(22) Filed: Jun. 5, 2017

(65) Prior Publication Data
US 2017/0359091 A1    Dec. 14, 2017

(30) Foreign Application Priority Data

Jun. 9, 2016   (JP) ................. 2016-115487

(51) Int. Cl.
*G02B 6/26* (2006.01)
*G02B 6/42* (2006.01)
(Continued)

(52) U.S. Cl.
CPC ....... *G02B 6/4439* (2013.01); *G02B 6/02042* (2013.01); *G02B 6/3825* (2013.01); *G02B 6/4472* (2013.01); *H04B 1/03* (2013.01)

(58) Field of Classification Search
CPC .. G02B 6/3825; G02B 6/4439; G02B 6/4471; G02B 6/4472; G02B 6/4475; G02B 6/02042
(Continued)

(56) References Cited

U.S. PATENT DOCUMENTS 4,986,762 A * 1/1991 Keith ................... G02B 6/3823
                                                                         385/76
6,227,885 B1 * 5/2001 Raviv .................. H01R 9/2466
                                                                         439/131
(Continued)

FOREIGN PATENT DOCUMENTS

EP        2434317 A1 *  3/2012 ............... G02B 6/00
WO   WO-2010/148325 A1   12/2010

*Primary Examiner* — Robert Tavlykaev
(74) *Attorney, Agent, or Firm* — Drinker Biddle & Reath LLP

(57) ABSTRACT

A multi-core/single-core conversion module is disclosed. The multi-core/single-core conversion module includes a housing including a first end, a second end and a lateral wall defining an inner space between the first end and the second end, a first adapter attached to the first end of the housing, two or more second adapters attached to the second end of the housing, a multi-core optical connector inserted into the first adapter from the inner space of the housing, a plurality of single-core optical connectors respectively inserted into the second adapters from the inner space of the housing, and a plurality of optical fibers connecting the multi-core optical connector to the plurality of single-core optical connectors with each other. The second adapters are arranged on the second end across a plurality of tiers. An opening can be formed by a part of the lateral wall being detached.

22 Claims, 9 Drawing Sheets

(51) Int. Cl.
  *G02B 6/44*    (2006.01)
  *G02B 6/38*    (2006.01)
  *G02B 6/02*    (2006.01)
  *H04B 1/03*    (2006.01)
(58) Field of Classification Search
  USPC .................................................. 385/22, 134
  See application file for complete search history.

(56) References Cited

U.S. PATENT DOCUMENTS

| | | | | |
|---|---|---|---|---|
| D759,596 S | * | 6/2016 | Byrne | D13/137.2 |
| 9,599,779 B2 | * | 3/2017 | Lee | G02B 6/3897 |
| 9,625,668 B2 | * | 4/2017 | Xu | G02B 6/4455 |
| 2010/0310225 A1 | * | 12/2010 | Anderson | G02B 6/4455 |
| | | | | 385/135 |
| 2010/0322579 A1 | * | 12/2010 | Cooke | G02B 6/4452 |
| | | | | 385/135 |
| 2015/0205060 A1 | * | 7/2015 | Chen | G02B 6/3869 |
| | | | | 385/89 |

* cited by examiner

MULTI-CORE/SINGLE-CORE CONVERSION MODULE AND MULTI-CORE/SINGLE-CORE CONVERSION APPARATUS

CROSS REFERENCE TO RELATED APPLICATIONS

This application is based upon and claims the benefit of priority from Japanese Patent Application No. 2016-115487, filed on Jun. 9, 2016; the entire contents of which are incorporated herein by reference.

TECHNICAL FIELD

The present invention relates to a multi-core/single-core conversion module and a multi-core/single-core conversion apparatus.

BACKGROUND

WO2010/148325 discloses an apparatus for packing a fiber optic cable in a high density. The apparatus includes a plurality of fiber optic modules, in which each fiber optic module has a housing, an MPO fiber optic adapter provided on a rear face of the housing, and a plurality of LC fiber optic adapters provided on a front face of the housing. The plurality of LC fiber optic adapters is arranged on the front face of the housing to be aligned in a direction along a bottom face of the housing. Inside the housing, optical fibers extends from LC connectors which are inserted into the respective LC fiber optic adapters, these optical fibers are connected together to an MPO connector, and the MPO connector is inserted into the MPO fiber optic adapter.

SUMMARY

As an aspect of the present invention, a multi-core/single-core conversion module comprises a housing including a first end, a second end, and a lateral wall defining an inner space between the first end and the second end; a first adapter attached to the first end of the housing; two or more second adapters attached to the second end of the housing; a multi-core optical connector inserted into the first adapter from the inner space of the housing; a plurality of single-core optical connectors respectively inserted into the second adapters from the inner space of the housing; and a plurality of optical fibers connecting the multi-core optical connector to the plurality of single-core optical connectors with each other. The second adapters are arranged on the second end across a plurality of tiers. An opening can be formed by a part of the lateral wall being detached.

As another aspect of the present invention, a multi-core/single-core conversion module comprises a first and a second unit modules each unit module comprising a housing including a first end, a second end and a lateral wall defining an inner space between the first end and the second end, a first adapter attached to the first end of the housing, and two or more second adapters attached to the second end of the housing; a multi-core optical connector inserted into the first adapter of the first unit module from the inner space of the housing; a first single-core optical connector inserted into one of the second adapters of the first unit module from the inner space of the housing of the first unit module; a second single-core optical connector inserted into one of the second adapters of the second unit module from the inner space of the housing of the second unit module; and a plurality of optical fibers connecting the multi-core optical connector to the first and second single-core optical connectors with each other. The second adapters are arranged on the second end of each unit module across a plurality of tiers. The optical fiber connecting the multi-core optical connector with the second single-core optical connector with each other passes through an opening formed on the lateral wall of the first unit module and an opening formed on the lateral wall of the second unit module.

BRIEF DESCRIPTION OF THE DRAWINGS

The foregoing and other purposes, aspects and advantages will be better understood from the following detailed description of embodiments of the invention with reference to the drawings, in which.

DETAILED DESCRIPTION

Figure 1:
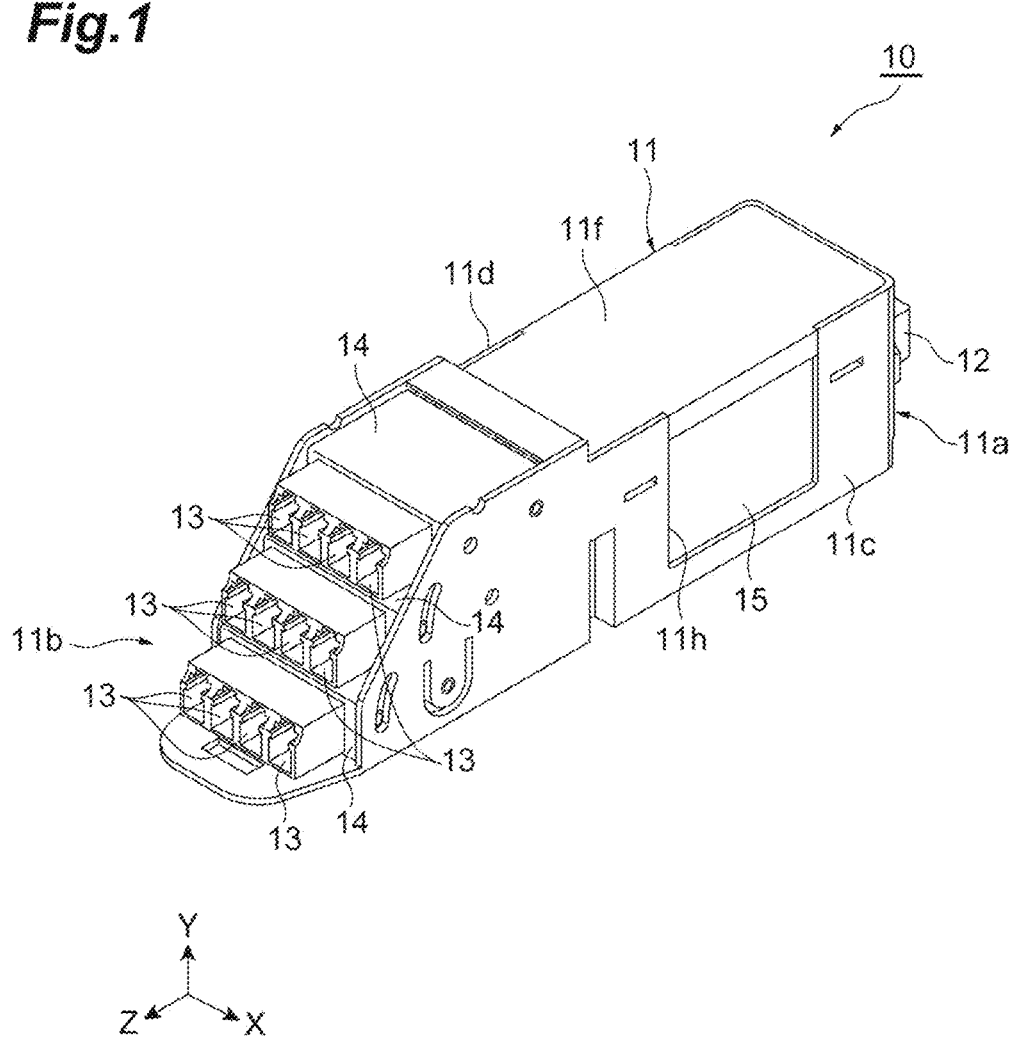
FIG. 1 is a perspective view showing an outer appearance of a multi-core/single-core conversion module according to an embodiment of the present invention, the multi-core/single-core conversion module being seen obliquely from above.

Description of Embodiment of the Present Application

First, contents of embodiments of the present invention are recited and described. A first multi-core/single-core conversion module according to an embodiment of the present invention comprises a housing including a first end, a second end, and a lateral wall defining an inner space between the first end and the second end; a first adapter attached to the first end of the housing; two or more second adapters attached to the second end of the housing; a multi-core optical connector inserted into the first adapter from the inner space of the housing; a plurality of single-core optical connectors respectively inserted into the second adapters from the inner space of the housing; and a plurality of optical fibers connecting the multi-core optical connector to the plurality of single-core optical connectors with each other. The second adapters are arranged on the second end across a plurality of tiers, and an opening can be formed by a part of the lateral wall being detached.

The first multi-core/single-core conversion module has two or more second adapters for single-core optical connectors arranged across a plurality of tiers. Since this conversion module is different from a configuration where a plurality of multi-core/single-core conversion modules are stacked each having the single-core optical connector adapters arranged on one tier, it is possible to reduce works to draw out the module for each tier when the module is exchanged. Therefore, the exchange work can be facilitated with the above multi-core/single-core conversion module.

In the first multi-core/single-core conversion module, the lateral wall is configured so that the opening can be formed thereon, and at least one optical fiber of the optical fiber extending from the multi-core optical connector and the optical fiber extending from the single-core optical connector can be led from the relevant opening to an adjacent module. When the number of cores of the multi-core fiber optic cable increases, besides the single-core optical connector adapter of the relevant module, the single-core optical connector adapter of the adjacent module can be used. Therefore, with the multi-core/single-core conversion module, the number of the single-core optical connector adapters can be easily increased or decreased depending on the number of cores of the multi-core fiber optic cable, the various numbers of cores of the multi-core fiber optic cable can be supported.

A second multi-core/single-core conversion module according to an embodiment of the present invention a first and a second unit modules each unit module comprising a housing including a first end, a second end and a lateral wall defining an inner space between the first end and the second end, a first adapter attached to the first end of the housing, and two or more second adapters attached to the second end of the housing; a multi-core optical connector inserted into the first adapter of the first unit module from the inner space of the housing; a first single-core optical connector inserted into one of the second adapters of the first unit module from the inner space of the housing of the first unit module; a second single-core optical connector inserted into one of the second adapters of the second unit module from the inner space of the housing of the second unit module; and a plurality of optical fibers connecting the multi-core optical connector to the first and second single-core optical connectors with each other. The second adapters are arranged on the second end of each unit module across a plurality of tiers. The optical fiber connecting the multi-core optical connector with the second single-core optical connector with each other passes through an opening formed on the lateral wall of the first unit module and an opening formed on the lateral wall of the second unit module.

Since the second multi-core/single-core conversion module has, similarly to the first multi-core/single-core conversion module descried above, two or more second adapters for single-core optical connectors arranged across a plurality of tiers, the exchange work can be facilitated. Additionally, in the second multi-core/single-core conversion module, the optical fiber extending from the multi-core optical connector passes through the opening formed on the lateral wall of the first unit module and the opening formed on the lateral wall of the second unit module to reach the second single-core optical connector. When the number of cores of the multi-core fiber optic cable decreases, the second unit module can be easily removed. In other words, according to the second multi-core/single-core conversion module, since the number of the single-core optical connector adapters can be easily increased or decreased depending on the number of cores of the multi-core fiber optic cable, the various numbers of cores of the multi-core fiber optic cable can be supported.

The second multi-core/single-core conversion module may further comprise a module coupling member having one end detachably attached to the lateral wall of the first unit module and the other end detachably attached to the lateral wall of the second unit module. This allows the first and second unit modules to be easily fixed to each other without obstructing the optical fiber led from the first unit module to the second unit module.

The first and second multi-core/single-core conversion modules may further comprise an adapter holder attached to the housing so as to be pivotable around an axis line crossing a tier direction of the plurality of tiers to hold the second connector adapter for each tier. This makes it possible to make spaces, when inserting and drawing out the single-core optical connector into and from the second adapter for a single-core optical connector, between the relevant connector and the single-core optical connectors locating on upper and lower tiers of the relevant connector, allowing a finger of a worker to be easily inserted between the tiers to facilitate the inserting and drawing out work.

A multi-core/single-core conversion apparatus according to an embodiment of the present invention comprises a plurality of multi-core/single-core conversion modules including at least one of the first multi-core/single-core conversion module and the second multi-core/single-core conversion module, and a base member supporting the plurality of multi-core/single-core conversion modules. The base member may provide a plurality of areas for placing the plurality of multi-core/single-core conversion modules thereon, and the plurality of areas may be arranged along a first direction. The plurality of multi-core/single-core conversion modules may be respectively placed on the plurality of areas along the first direction in such a way that adjacent lateral walls of the plurality of multi-core/single-core conversion modules are faced with each other. According to the multi-core/single-core conversion apparatus, similarly to the multi-core/single-core conversion module described above, the exchange work of the multi-core/single-core conversion module can be facilitated and the various numbers of cores of the multi-core fiber optic cable can be supported.

Detail of Embodiments of the Present Application

A description is given below of concrete examples of the multi-core/single-core conversion module and the multi-core/single-core conversion apparatus according to the embodiments of the present invention with reference to the drawings. The invention is not limited to the examples, and is intended to include the meanings shown by the scope of the Claims and equivalent to the scope of the Claims, and all changes in the scope thereof. In the following description, the same components in description of the drawings are designated by the same reference signs, and the duplicated description is omitted. Note that a common XYZ orthogonal coordinate system is shown in each drawing for easy understanding.

Figure 2:
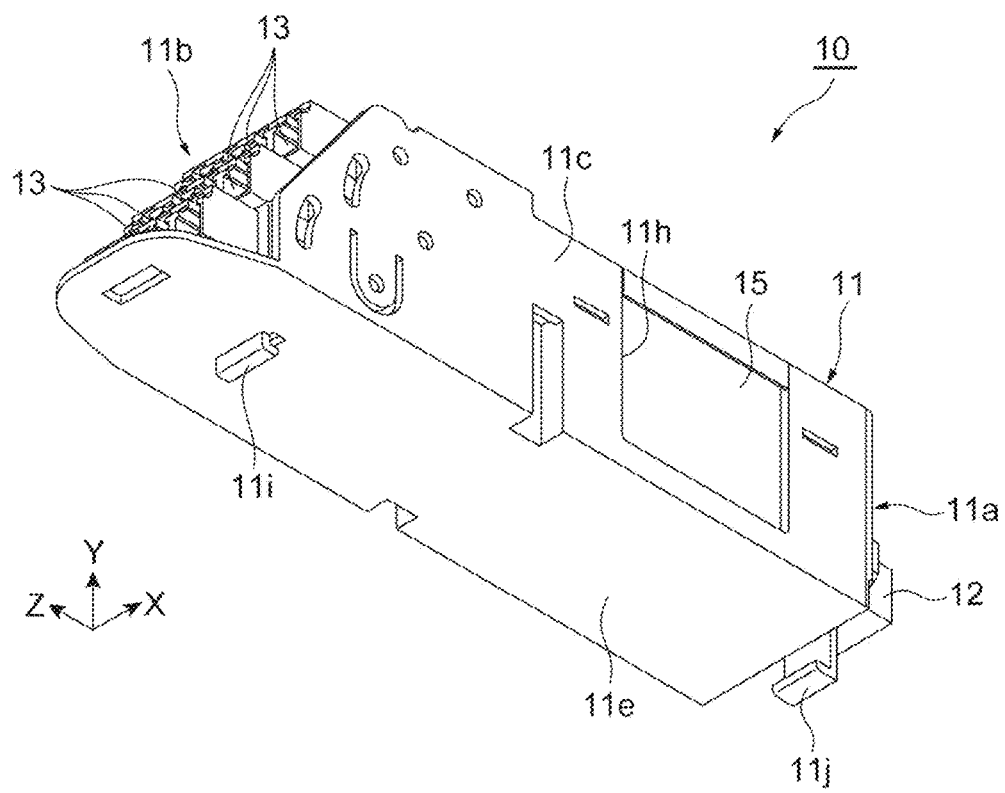
FIG. 2 is a perspective view showing an outer appearance of the multi-core/single-core conversion module according to an embodiment of the present invention, the multi-core/single-core conversion module being seen obliquely from below.

FIG. 1 and FIG. 2 are each a perspective view showing an outer appearance of a first multi-core/single-core conversion module (hereinafter, referred to as conversion module) 10 according to an embodiment of the present invention. FIG. 1 is a view of the conversion module 10 seen obliquely from above and FIG. 2 is a view of the conversion module 10 seen obliquely from below. As shown in FIG. 1 and FIG. 2, the conversion module 10 in the embodiment includes a hollow housing 11 in a substantially rectangular parallelepiped shape extending in a Z direction, a multi-core optical connector adapter 12, and two or more single-core optical connector adapters 13. The housing 11 is made of, for example, integrally molded resin for the sake of lower cost and light weight. The housing 11 includes a rear end 11a and a front end 11b arranged along the Z direction, a pair of lateral walls 11c and 11d in a substantially rectangular shape joining the rear end 11a and the front end 11b, a bottom panel 11e in a substantially rectangular shape, and a top panel 11f in a substantially rectangular shape.

The multi-core optical connector adapter 12 is an adapter for connecting a multi-core optical connector (e.g., an MPO connector) having, for example, 12 cores or 24 cores, and has a pair of openings for respectively accepting two multi-core optical connectors. The multi-core optical connector adapter 12 is attached to the rear end 11a of the housing 11. Specifically, the multi-core optical connector adapter 12 is fixed to penetrate through a rear wall provided to the rear end 11a of the housing 11, and one opening is located inside the housing 11 and the other opening is located outside the housing 11.

Each single-core optical connector adapter 13 is an adapter for connecting a single-core optical connector (e.g., an LC connector), and has a pair of openings for respectively accepting two single-core optical connectors. The single-core optical connector adapter 13 is attached to the front end 11b of the housing 11. Specifically, two or more single-core optical connector adapters 13 are arranged on the front end 11b across a plurality of tiers. In the embodiment, four single-core optical connector adapters 13 per one tier are arranged across three tiers. The plurality of single-core optical connector adapters 13 (four in the embodiment) located on the same tier may be made into one body. A single single-core optical connector adapter 13 and the single-core optical connector adapters 13 made into one body may be present together in combination. One opening of the single-core optical connector adapter 13 is located inside the housing 11, and the other opening is located outside the housing 11.

Figure 3:
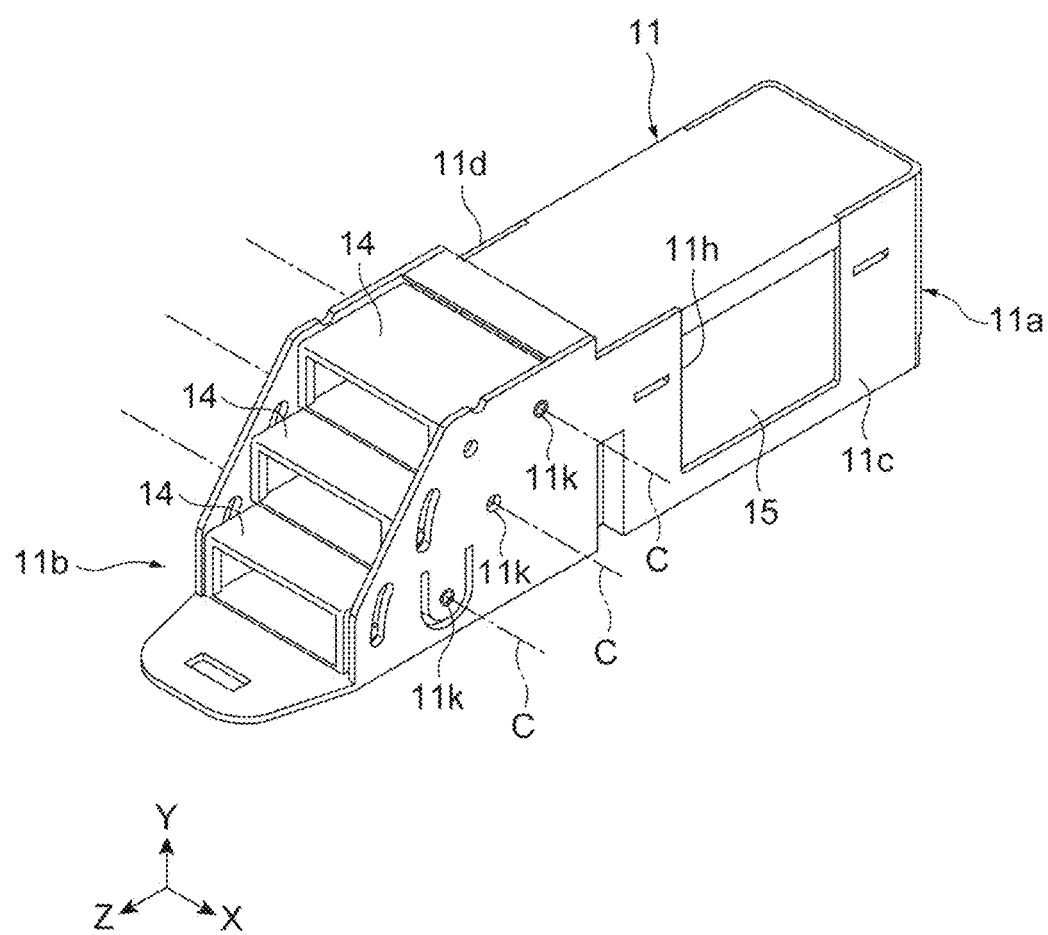
FIG. 3 is a perspective view showing an outer appearance of the multi-core/single-core conversion module shown in FIG. 1 in a state where the single-core optical connector adapter is detached.

These single-core optical connector adapters 13 are held in an adapter socket 14 (adapter holder) provided to the front end 11b of the housing 11. Here, FIG. 3 is a perspective view showing a state where the single-core optical connector adapter 13 is detached. As shown in FIG. 3, the adapter socket 14 is provided by one per one tier, and three adapter sockets 14 are provided in the embodiment. These adapter sockets 14 each assume a tube having a rectangular section and each extend in the Z direction, for example.

These adapter sockets 14 are each attached to the housing 11 so as to be pivotable around an axis line C crossing a tier direction (Y axis direction). For example, columnar protrusions are provided on both lateral faces of the adapter socket 14 in the axis lines C, and these protrusions fit with circular bores 11k formed on the lateral walls 11c and 11d of the housing 11 such that the adapter sockets 14 are pivotable around the axis lines C. Note that the lateral walls 11c and 11d are partially cut out around the circular bores 11k on a lowermost tier to be easily deformable so as to facilitate the fit of the protrusions.

As shown in FIG. 1, the adapter socket 14 on the lowermost tier collectively houses four single-core optical connector adapters 13 on the lower most tier. The adapter socket 14 on a middle tier collectively houses four single-core optical connector adapters 13 on the middle tier. The adapter socket 14 on an uppermost tier collectively houses four single-core optical connector adapters 13 on the uppermost tier.

As shown in FIG. 3, the closer to the lowermost tier, the more forward the adapter socket 14 is located. In other words, the adapter socket 14 on the middle tier is located more forward than the adapter socket 14 on the uppermost tier, and the adapter socket 14 on the lowermost tier is located more forward than the adapter socket 14 on the middle tier. Therefore, the closer to the lowermost tier, the more forward the single-core optical connector adapter 13 locates. In other words, the single-core optical connector adapters 13 on the middle tier are located more forward than the single-core optical connector adapters 13 on the uppermost tier, and the single-core optical connector adapters 13 on the lowermost tier are located more forward than the single-core optical connector adapters 13 on the middle tier. Note that the adapter sockets 14 (single-core optical connector adapters 13) on the respective tiers may be arranged along the same position in the Z direction.

The lateral walls 11c and 11d of the housing 11 are each configured such that the opening can be formed by a part thereof being detached. For example, on each of the lateral walls 11c and 11d of the housing 11, an opening 11h closed by a detachable shutter 15 is formed. The opening 11h is formed into a rectangular shape, for example, and in an example, is formed from an uppermost portion of each of the lateral walls 11c and 11d (i.e., portion in contact with the top panel 11f) through a lowermost portion of each of the lateral walls 11c and 11d (i.e., portion in contact with the bottom panel 11e). When the opening 11h is used, the shutter 15 is detached from the opening 11h.

Figure 4:
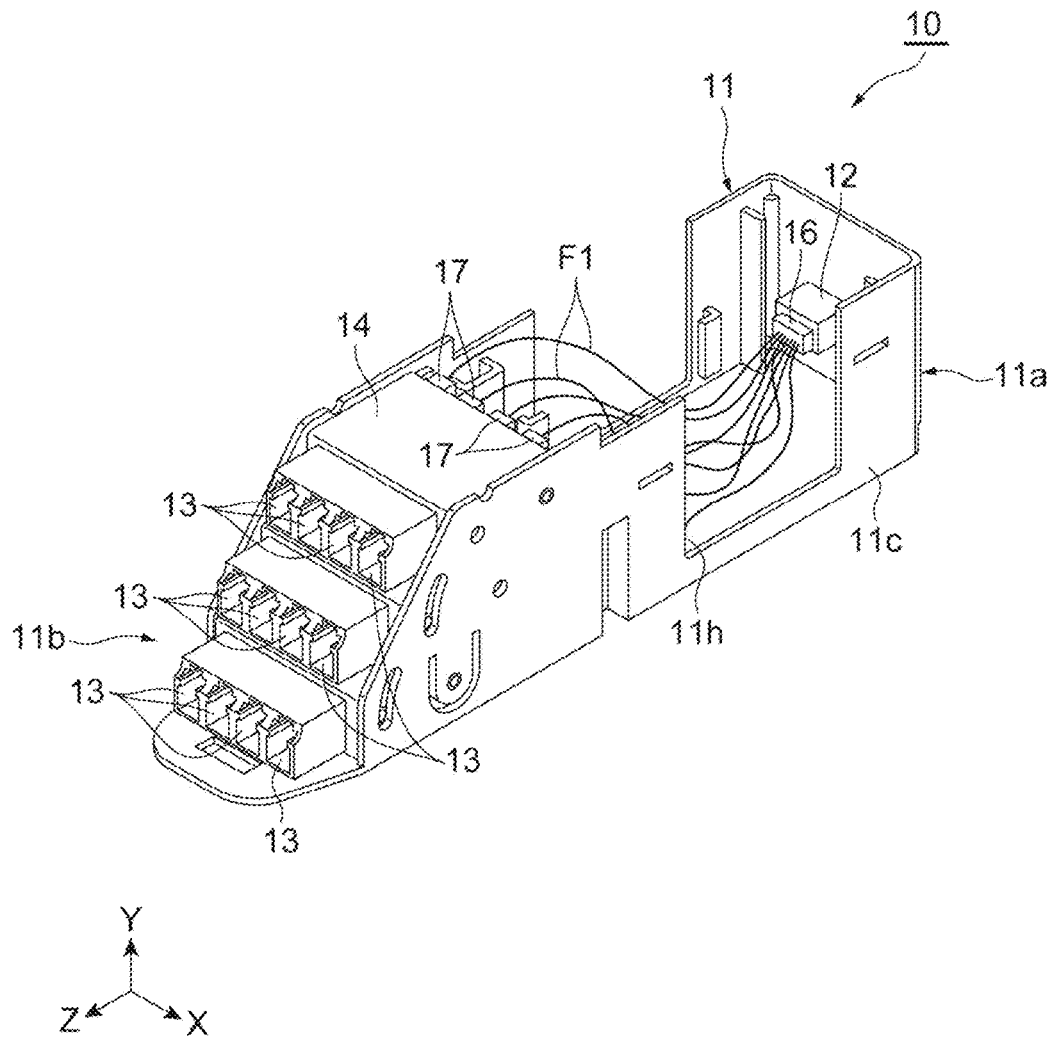
FIG. 4 is a perspective view showing the conversion module in a state where a top panel and a shutter are detached.

FIG. 4 is a perspective view showing the conversion module 10 in a state where the top panel 11f and the shutter 15 are detached. As shown in FIG. 4, a multi-core optical connector 16 is inserted into the multi-core optical connector adapter 12 from the inner side of the housing 11, and many optical fibers F1 extend from the multi-core optical connector 16. A single-core optical connector 17 is inserted into the single-core optical connector adapter 13 from the inner side of the housing 11, and one optical fiber F1 extends from the single-core optical connector 17. In FIG. 4, these optical fibers F1 connect the multi-core optical connector 16 with the single-core optical connectors 17 with each other, but the opening 11h leads, to an adjacent module, at least one optical fiber F1 of the optical fibers F1 extending from the multi-core optical connector 16 and the optical fibers F1 extending from the single-core optical connectors 17, as needed.

The multi-core optical connector attached to a tip end of the multi-core fiber optic cable extending from outside the conversion module 10 is inserted into the multi-core optical connector adapter 12 from the outer side of the housing 11. This allows the relevant multi-core optical connector and the multi-core optical connector 16 to face to each other inside the multi-core optical connector adapter 12 to be optically linked to each other. The single-core optical connector attached to a tip of the single-core fiber optic cable extending from outside the conversion module 10 is inserted into the single-core optical connector adapter 13 from the outer side of the housing 11. This allows the relevant single-core optical connector and the single-core optical connector 17 to face to each other inside the single-core optical connector adapter 13 to be optically linked to each other.

When assembling the conversion module 10 in the embodiment having the above configuration, firstly, the multi-core optical connector 16 and the plurality of single-core optical connectors 17 are connected to each other by the optical fibers F1. Next, the plurality of single-core optical connectors 17 and the optical fibers F1 are divided into three sets and the multi-core optical connector 16 is inserted into the multi-core optical connector adapter 12, and thereafter, the sets of the single-core optical connectors 17 and the optical fibers F1 are passed through the corresponding adapter sockets 14, respectively. Then, each single-core optical connector 17 is inserted into the corresponding single-core optical connector adapter 13. Subsequently, each single-core optical connector adapter 13 is inserted into the corresponding adapter socket 14 and the respective adapter sockets 14 are attached to the housing 11 in order from the lowermost tier. The shutter 15 is attached to the housing 11, as needed, and the optical fibers F1 are housed inside the housing 11. Finally, the top panel 11f is attached to the housing 11 to complete the conversion module 10. In this way, even in a case where a single conversion module 10 is used rather than a plurality thereof coupled to each other, an assembling work, particularly, a connecting work of the optical fibers F1 inside the housing 11 can be further facilitated by detaching the shutter 15 in advance and finally attaching the shutter 15 to close the opening 11h.

Figure 5:
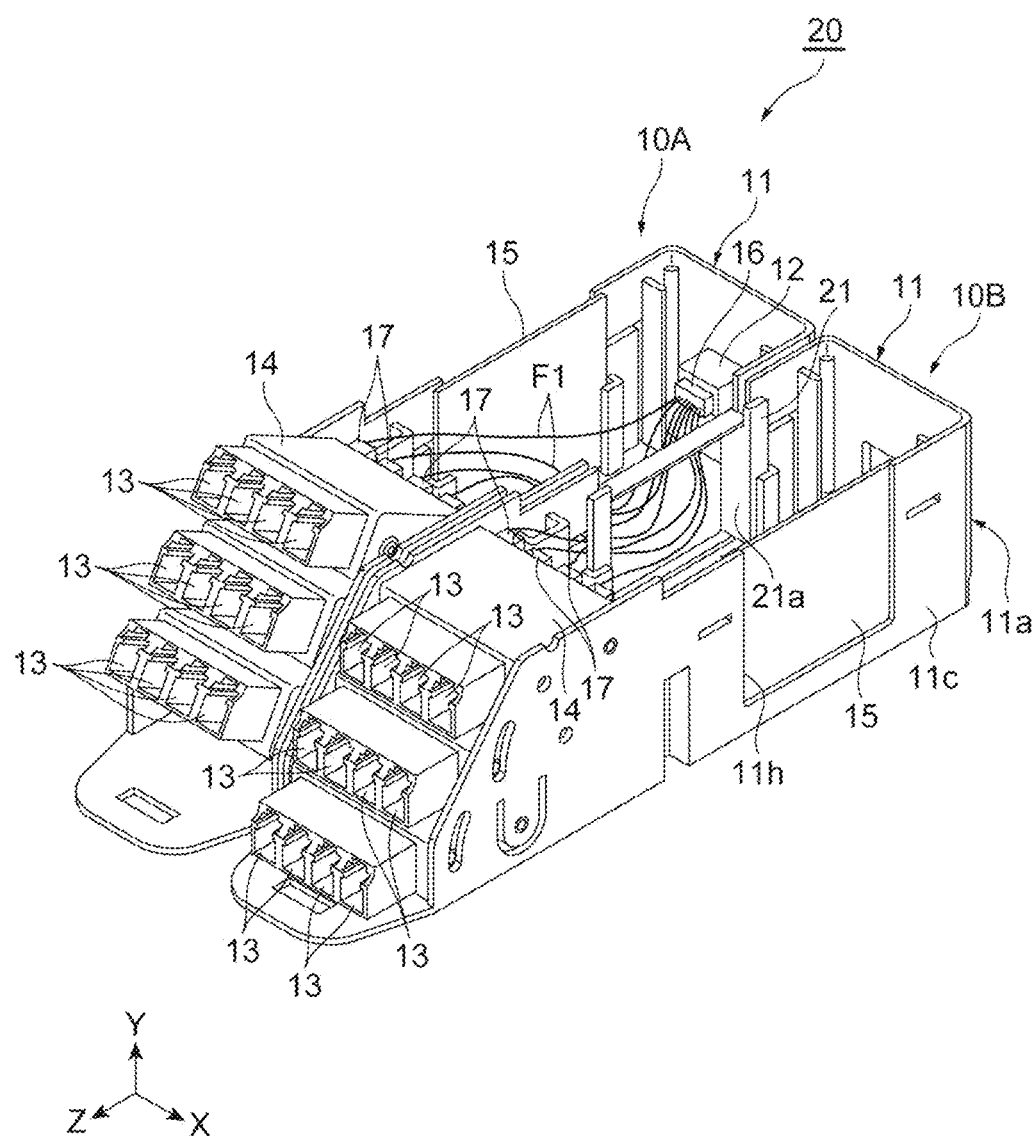
FIG. 5 is a perspective view showing a conversion modules coupling structure.

FIG. 5 is a perspective view showing a second conversion module 20 according to the embodiment. FIG. 5 omits showing the top panel 11f. As shown in FIG. 5, the conversion module 20 includes a first unit module 10A and a second unit module 10B. Note that configurations of these unit modules 10A and 10B are the same as that of the conversion module 10 described above. The single-core optical connector 17 of the unit module 10A is an example of the first single-core optical connector, and the single-core optical connector 17 of the unit module 10B is an example of the second single-core optical connector.

The conversion module 20 further includes a module coupling member 21. The module coupling member 21 spans the opening 11h of the unit module 10A and the opening 11h of the unit module 10B, and has one end on the unit module 10A side detachably attached to the opening 11h on the lateral wall 11c of the unit module 10A and the other end on the unit module 10B side detachably attached to the opening 11h on the lateral wall 11d of the unit module 10B. The module coupling member 21 has an open hole 21a penetrating from one end to the other end thereof. The open hole 21a is formed into, for example, a shape similar to the shape of the opening 11h (rectangular shape, in an example). The module coupling member 21 couples the housing 11 of the unit module 10A with the housing 11 of the unit module 10B to each other, and communicates the opening 11h on the lateral wall 11c of the unit module 10A with the opening 11h on the lateral wall 11d of the unit module 10B with each other.

The optical fibers F1 extending from the multi-core optical connector 16 of the first unit module 10A pass through the respective openings 11h (that is, through the module coupling member 21) to be led to the second unit module 10B. For example, in FIG. 5, a part of the optical fibers F1 extending from the multi-core optical connector 16 of the unit module 10A pass through the module coupling member 21 to be led into the housing 11 of the unit module 10B and are connected to the single-core optical connectors 17 of the unit module 10B. According to such a configuration, the number of cores of the multi-core optical connector 16 in the unit module 10A can be increased (expanded) more than the number of the single-core optical connectors 17 in the unit module 10A. In other words, in this example, the number of cores of the multi-core optical connector 16 can be expanded to 24 cores. Further, the expansion can be easily made by the number of the coupled unit modules such as 36 cores and 48 cores. Additionally, a plurality of coupled unit modules can be dealt with as one body. For this reason, in the expansion, it is not necessary to prepare different shape unit modules, so long as the required number of the same shape unit modules are prepared.

Figure 6:
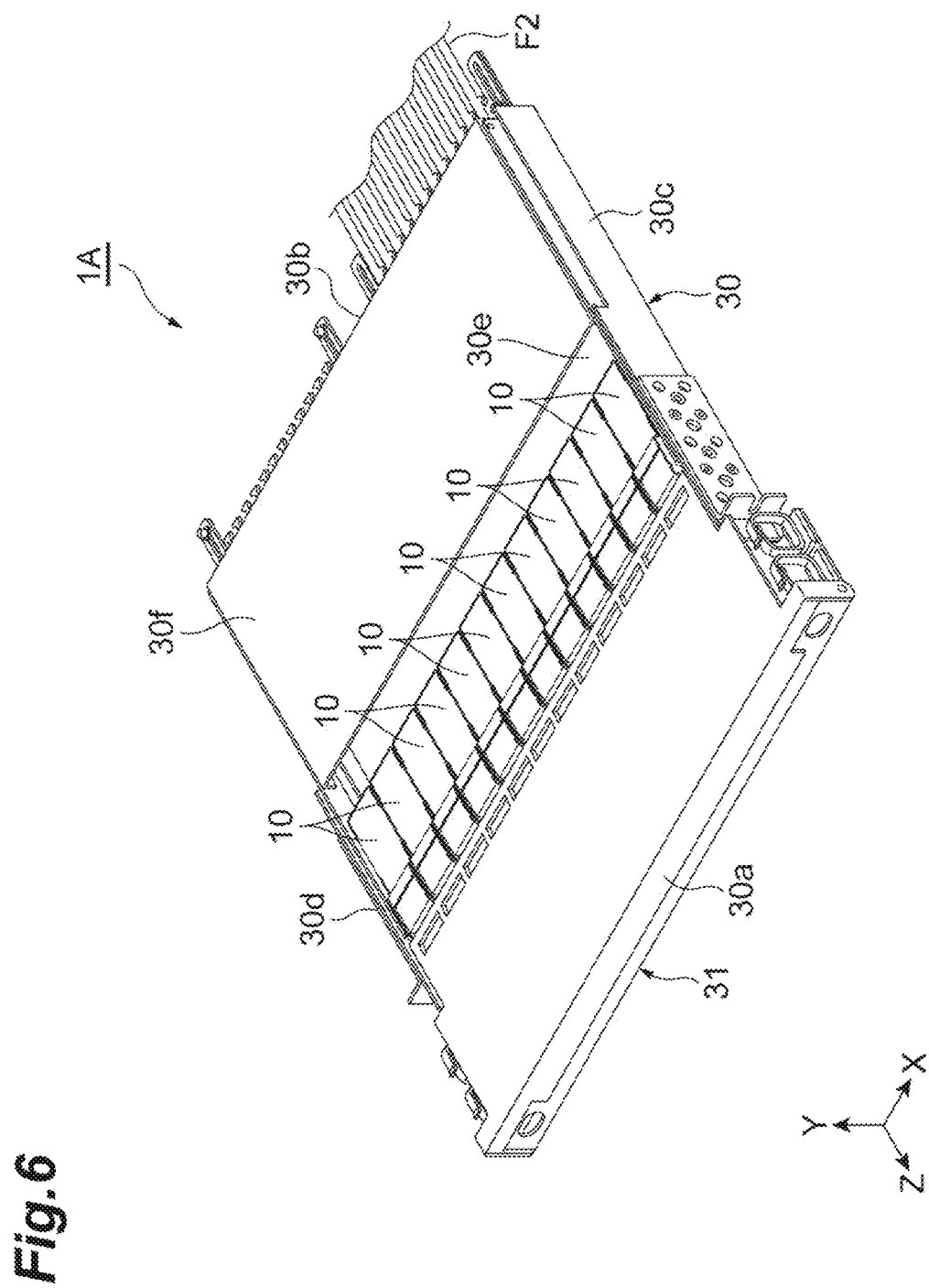
FIG. 6 is a perspective view showing an outer appearance of a multi-core/single-core conversion apparatus as seen obliquely from front.
Figure 7:
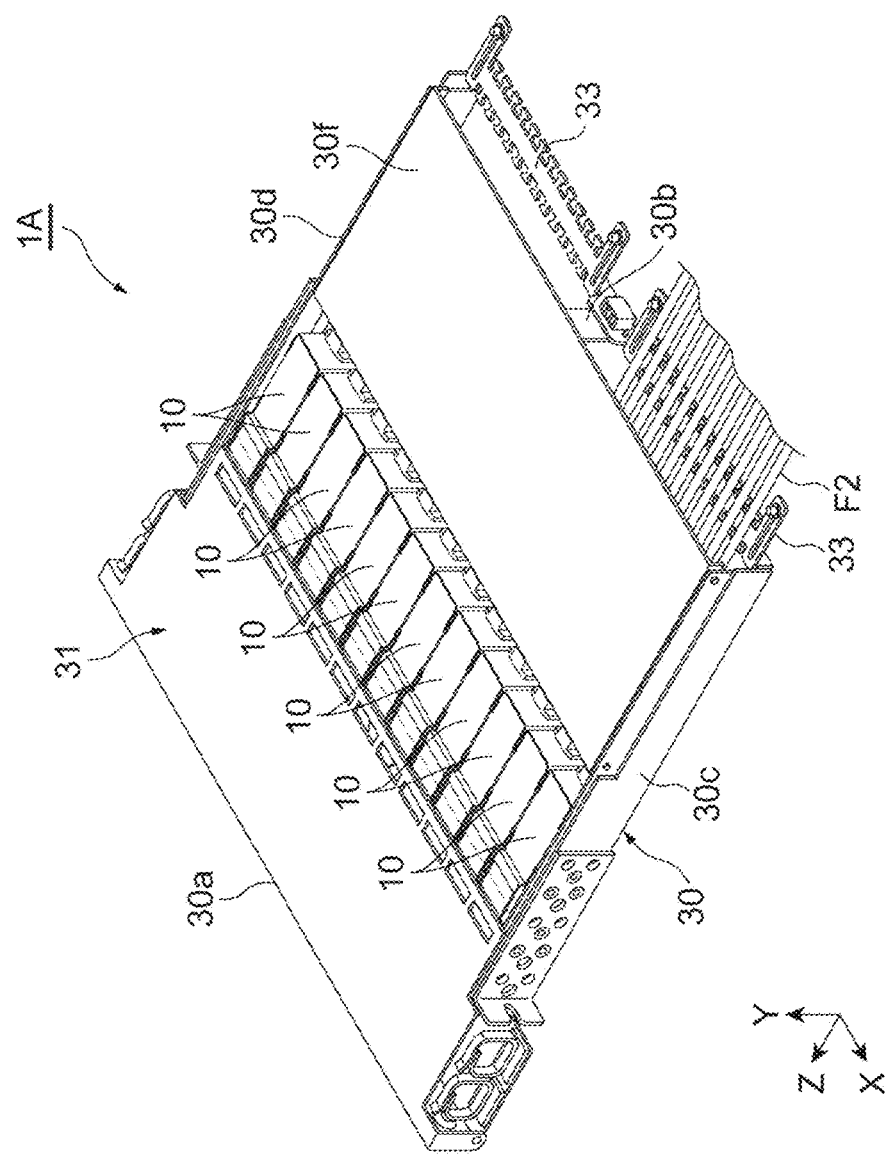
FIG. 7 is a perspective view showing an outer appearance of the multi-core/single-core conversion apparatus as seen obliquely from back.
Figure 8:
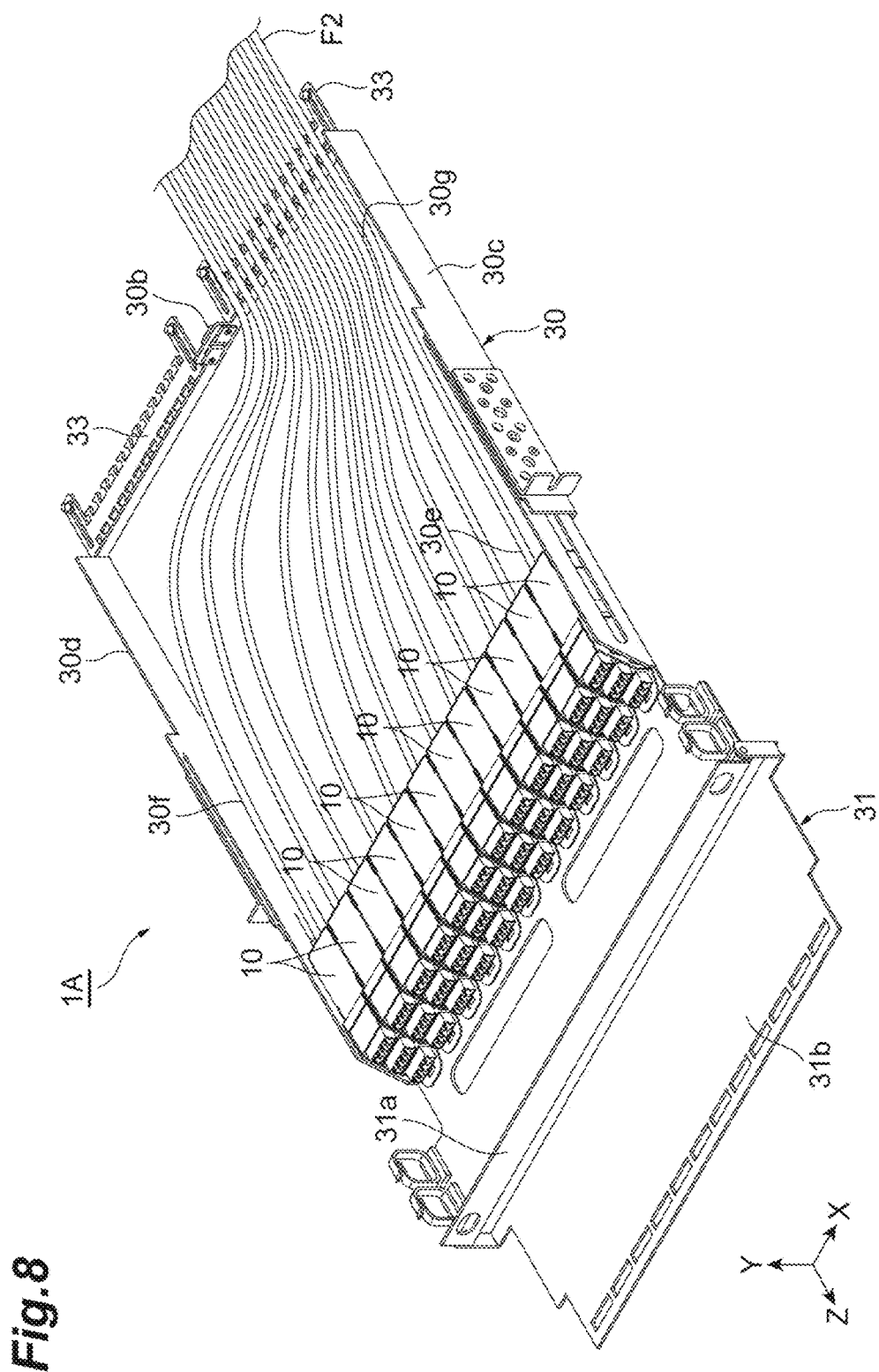
FIG. 8 is a perspective view of the multi-core/single-core conversion apparatus in a state where a front lid of a base member is open.

FIG. 6 to FIG. 8 each are a perspective view showing an outer appearance of a multi-core/single-core conversion apparatus (hereinafter, referred to as conversion apparatus) 1A according to the embodiment. FIG. 6 shows an outer appearance of the conversion apparatus 1A as seen obliquely from front, and FIG. 7 shows an outer appearance of the conversion apparatus 1A as seen obliquely from back. FIG. 8 is a perspective view showing a state where a front lid 31 of a base member 30 that the conversion apparatus 1A includes is open.

As shown in FIG. 6 to FIG. 8, the conversion apparatus 1A includes a plurality of conversion modules 10 and the base member 30. A part or all of the plurality of conversion modules 10 may be the unit module 10A or 10B shown in FIG. 5. In other words, at least one of the conversion module 10 and the conversion module 20 is included in the plurality of conversion modules that the conversion apparatus 1A includes. The base member 30 is a member made of metal supporting the plurality of conversion modules 10. The base member 30 is a hollow box-like member in a rectangular parallelepiped shape. As shown in FIG. 6 and FIG. 7, the base member 30 has a front face 30a, a rear face 30b, a pair of lateral faces 30c and 30d, a bottom panel 30e, and a top panel 30f. The plurality of conversion modules 10 are arranged on the bottom panel 30e inside the base member 30 along an X direction (first direction).

Figure 9:
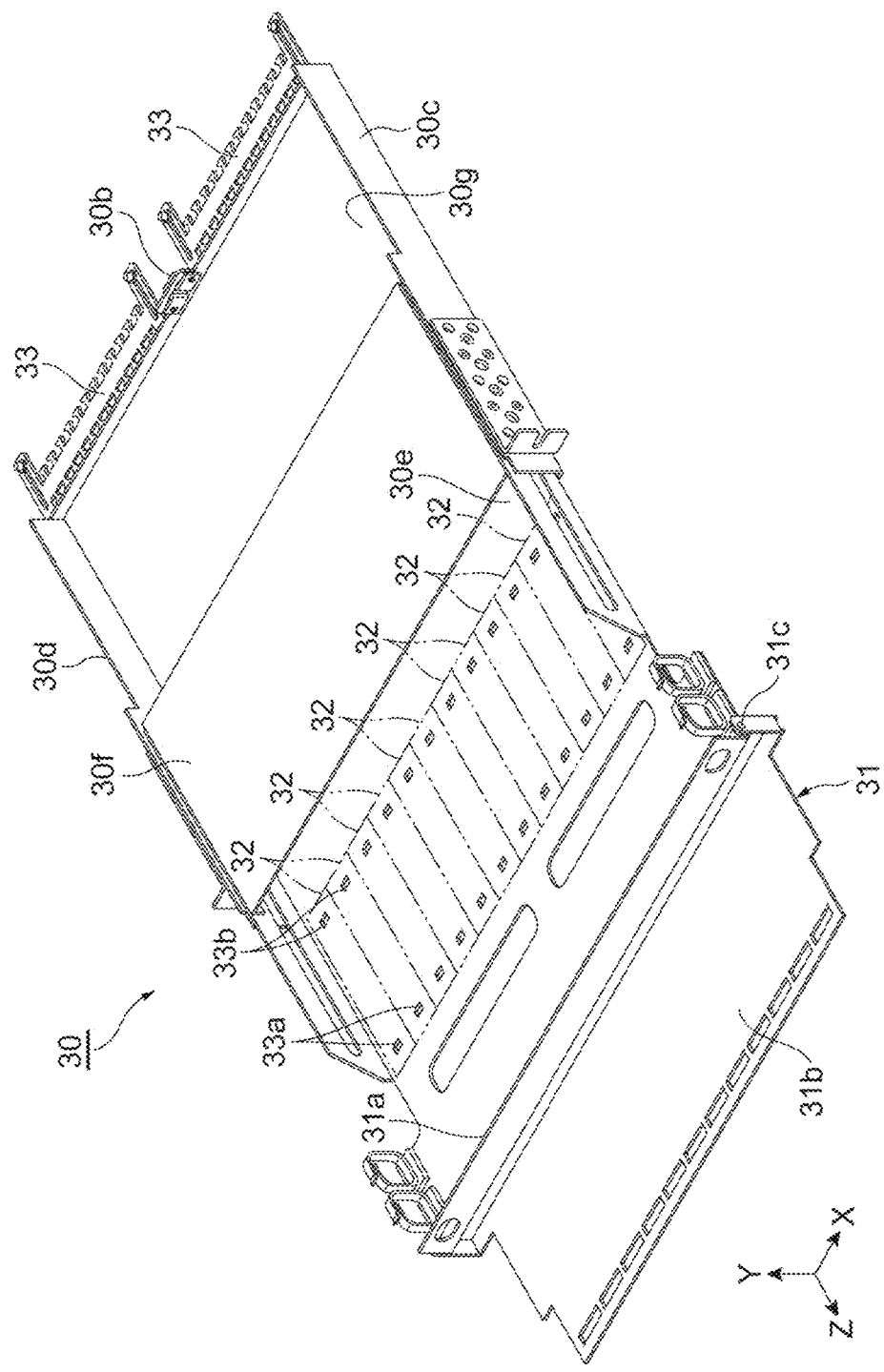
FIG. 9 is a perspective view showing a shape of the base member.

Here, FIG. 9 is a perspective view showing the shape of the base member 30. As shown in FIG. 9, the base member 30 has the front lid 31 provided to a front side thereof. The front lid 31 includes a plate 31a configuring the front face 30a of the base member 30 and a plate 31b configuring a part of the top panel, and the front lid 31 is configured by these plates 31a and 31b being joined perpendicularly with each other. The front lid 31 is attached on a front edge of the bottom panel 30e in a state of being pivotable around a shaft 31c extending in the X direction. This facilitates an access to each single-core optical connector adapter 13 of the plurality of conversion modules 10.

As shown in FIG. 9, the base member 30 has a plurality of areas 32 on the bottom panel 30e for placing the plurality of conversion modules 10 respectively. The plurality of areas 32 are provided to be arranged along the X direction. The plurality of conversion modules 10 are placed on the plurality of areas 32 in such a way that their lateral walls 11c and 11d are arranged with each other along the X direction. Two holes 33a and 33b are provided to each of these areas 32, and two hooks 11i and 11j (see FIG. 2) protruding from the bottom face of the housing 11 of each conversion module 10 engage with these holes 33a and 33b such that each conversion module 10 is easily fixed to the base member 30.

The bottom panel 30e is arranged overlapping another bottom panel 30g. The bottom panel 30g is formed into one body with lateral plates configuring the lateral faces 30c and 30d, and the bottom panel 30e is attached to be slidable to these bottom panel 30g and lateral faces 30c and 30d in the Z direction. This facilitates an access to each single-core optical connector adapter 13 of the plurality of conversion modules 10.

To an end of the bottom panel 30g on the rear face 30b side, provided is a supporting plate 33 supporting multi-core fiber optic cables F2 extending from the plurality of conversion modules 10. The supporting plate 33 is oriented in the same direction as the bottom panel 30e, and the multi-core fiber optic cables F2 are arranged on the supporting plate 33 along the X direction. This allows many multi-core fiber optic cables F2 to be orderly drawn out from the rear face 30b of the base member 30.

A description is given of effects obtained from the conversion module 10, the conversion module 20, the base member 30, and the conversion apparatus 1A according to the embodiment described above. In the conversion modules 10 and 20 in the embodiment, two or more single-core optical connector adapters 13 are arranged across a plurality of tiers. Since these conversion modules 10 and 20 are different from a configuration where a plurality of conversion modules are stacked each having the single-core optical connector adapters arranged on one tier, the conversion modules can be laterally aligned as shown in FIG. 8, for example. This allows, in exchanging the module, a worker to directly access the conversion module 10 (or 20) to be exchanged, reducing the work of drawing out for each tier the conversion modules to be exchanged which are across a plurality of tiers. Alternatively, even in a case where the plurality of conversion modules 10 (or 20) are stacked in a height direction (Y direction), the number of stacks is lowered as compared to the conventional configuration, allowing the number of times of drawing for each tier to be reduced. Therefore, the exchange work can be facilitated according to the conversion modules 10 and 20 in the embodiment.

In particular, according to the conversion modules 10 and 20 in the embodiment, it is possible to house the modules to be laterally aligned in a so-called 19-inch rack standardized by the Electronic Industries Alliance (EIA) in 1U size, for example, as well as the single-core optical connector adapters 13 can be arranged in plural tiers. For example, in the case of the conversion module 10, up to 1 tier×12 rows of the modules 10, that is, 144 single-core optical connector adapters 13 in total are housed in 1U size. Alternatively, in the case of the conversion module 20 coupling two unit modules, up to 1 tier×6 rows of the modules 20, that is, 144 single-core optical connector adapters 13 in total are housed. Of course, the conversion modules 10 and 20 may be present together in combination.

In the conversion module 10 in the embodiment, each of the lateral walls 11c and 11d is configured so that the opening 11h can be formed thereon, and at least one optical fiber F1 of the optical fiber F1 extending from the multi-core optical connector 16 and the optical fiber F1 extending from the single-core optical connector 17 is led from the relevant opening 11h to the adjacent module. When the number of cores of the multi-core fiber optic cable F2 increases, besides the single-core optical connector adapter 13 of the relevant module, the single-core optical connector adapter 13 of the adjacent module can be used. Therefore, according to the conversion module 10, since the number of the single-core optical connector adapters 13 can be easily increased or decreased depending on the number of cores of the multi-core fiber optic cable F2, the various numbers of cores of the multi-core fiber optic cable F2 can be supported.

Similarly to the above, in the conversion module 20 in the embodiment, a part of the optical fibers F1 extending from the multi-core optical connector 16 pass through the opening 11h formed on the lateral wall 11c of the unit module 10A and the opening 11h formed on the lateral wall 11d of the unit module 10B to reach the single-core optical connectors 17 of the unit module 10B. When the number of cores of the multi-core fiber optic cable F2 decreases, the unit module 10B can be easily removed. In other words, according to the conversion module 20, since the number of the single-core optical connector adapters 13 can be easily increased or decreased depending on the number of cores of the multi-core fiber optic cable F2, the various numbers of cores of the multi-core fiber optic cable F2 can be supported. Further, according to the conversion module 20 in the embodiment, since two unit modules 10A and 10B having the common configuration are used, cost reduction owing to commonalized components can be expected.

As in the embodiment, the conversion module 10 may include the module coupling member 21 shown in FIG. 5. This allows the unit module 10A and the unit module 10B to be easily fixed to each other by use of the opening 11h without obstructing the optical fiber F1 led from the unit module 10A to the unit module 10B.

As in the embodiment, the conversion modules 10 and 20 may include the pivotable adapter socket 14 shown in FIG. 3. This makes it possible to make spaces, when inserting and drawing out the single-core optical connector into and from the opening, of the single-core optical connector adapter 13, on the outer side of the housing, between the relevant connector and the single-core optical connectors located on upper and lower tiers of the relevant connector, allowing a finger of a worker to be easily inserted between the tiers to facilitate the inserting and drawing out work. Additionally, as in the embodiment, the closer to the lowermost tier, the more forward the single-core optical connector adapter 13 may be located. This can further facilitate the inserting and drawing work.

According to the conversion apparatus 1A in the embodiment, similarly to the conversion modules 10 and 20 described above, the exchange work can be facilitated and the various numbers of cores of the multi-core fiber optic cable F2 can be supported.

The multi-core/single-core conversion module and the multi-core/single-core conversion apparatus according to the present invention are not limited to the above embodiments and can be variously modified in other ways. For example, the above embodiment shows the example in which the single-core optical connector adapters are arranged on three tiers, but the single-core optical connector adapters can be arranged on the various numbers of two or more tiers. Moreover, the above embodiment shows the example in which the opening is formed on the lateral wall on each of both sides, but the opening may be formed only on the lateral wall on one side. Further, the above embodiment shows the example in which the module coupling member is attached to the opening on the lateral wall, but the module coupling member may be attached to another portion on the lateral wall, or may be attached to other portion than on the lateral wall of the housing.

What is claimed is:
1. A multi-core/single-core conversion module comprising:
   a housing including a first end, a second end, and a lateral wall defining an inner space between the first end and the second end;
   a first adapter attached to the first end of the housing;
   two or more second adapters attached to the second end of the housing;
   a multi-core optical connector inserted into the first adapter from the inner space of the housing;
   a plurality of single-core optical connectors respectively inserted into the second adapters from the inner space of the housing; and a plurality of optical fibers connecting the multi-core optical connector to the plurality of single-core optical connectors with each other, wherein the second adapters are arranged on the second end across a plurality of tiers, and wherein a removably attachable shutter is configured to close an opening of the lateral wall of the housing in an attached state.

2. The multi-core/single-core conversion module according to claim 1, further comprising an adapter holder attached to the housing so as to be pivotable around an axis line crossing a tier direction of the plurality of tiers, the adapter holder holding the second adapters for each tier.

3. The multi-core/single-core conversion module according to claim 2, wherein the adapter holder includes one of a protrusion and a bore while the lateral wall includes other of the protrusion and the bore, and the protrusion fits with the bore so that the adapter holder is pivotable around the axis.

4. The multi-core/single-core conversion module according to claim 3, wherein the lateral wall includes a cut-out around the bore when the adapter holder includes the pivot and the lateral wall includes the bore.

5. A multi-core/single-core conversion apparatus comprising:

a plurality of multi-core/single-core conversion modules including the multi-core/single-core conversion module according to claim 2; and a base member supporting the plurality of multi-core/single-core conversion modules.

6. The multi-core/single-core conversion apparatus according to claim 5, wherein the base member provides a plurality of areas for placing the plurality of multi-core/single-core conversion modules thereon, the plurality of areas being arranged along a first direction, and wherein the plurality of multi-core/single-core conversion modules are respectively placed on the plurality of areas along the first direction in such a way that adjacent lateral walls of the plurality of multi-core/single-core conversion modules are faced with each other.

7. The multi-core/single-core conversion module according to claim 1, further comprising a plurality of adapter holders attached to the housing respectively, the plurality of adapter holders holding the second adapters, wherein the closer to the lowermost tier, the more outward the adapter holder is located.

8. The multi-core/single-core conversion module according to claim 1, further comprising an uppermost adapter holder, a lowermost adapter holder, and a middle adapter holder located between the uppermost adapter holder and the lowermost adapter holder, the uppermost adapter holder, the lowermost adapter holder and the middle adapter holder being attached to the housing, wherein the middle adapter holder is located more outward than the uppermost adapter holder, and the lowermost adapter holder is located more outward than the middle adapter holder.

9. The multi-core/single-core conversion module according to claim 1, further comprising a hook protruding from a bottom face of the housing.

10. The multi-core/single-core conversion module according to claim 1, wherein the first adapter is fixed so as to penetrate through a wall provided at the first end of the housing.

11. The multi-core/single-core conversion module according to claim 1, wherein the second adapters located on a same tier are made into one body.

12. A multi-core/single-core conversion apparatus comprising:

a plurality of multi-core/single-core conversion modules including the multi-core/single-core conversion module according to claim 1; and a base member supporting the plurality of multi-core/single-core conversion modules.

13. The multi-core/single-core conversion apparatus according to claim 12, wherein the base member provides a plurality of areas for placing the plurality of multi-core/single-core conversion modules thereon, the plurality of areas being arranged along a first direction, and wherein the plurality of multi-core/single-core conversion modules are respectively placed on the plurality of areas along the first direction in such a way that adjacent lateral walls of the plurality of multi-core/single-core conversion modules are faced with each other.

14. The multi-core/single-core conversion apparatus according to claim 13, wherein the plurality of areas for placing the conversion modules includes holes configured to engage with hooks provided on bottoms of the plurality of multi-core/single-core conversion modules.

15. The multi-core/single-core conversion apparatus according to claim 12, wherein the base member includes an openable lid provided at one end thereof, the lid covering one ends of the plurality of multi-core/single-core conversion modules when the lid is closed.

16. The multi-core/single-core conversion apparatus according to claim 12, wherein the base member includes a first bottom panel that places the plurality of multi-core/single-core conversion modules thereon, and a second bottom panel that overlaps the first bottom panel thereon, wherein the first bottom panel is slidable with respect to the second bottom panel, together with the plurality of multi-core/single-core conversion modules.

17. The multi-core/single-core conversion module according to claim 1, wherein the lateral wall includes a bar portion located between the opening and the bottom end.

18. The multi-core/single core conversion module according to claim 1, wherein the housing includes another lateral wall opposite to the lateral wall, and the another lateral wall includes an opening.

19. The multi-core/single core conversion module according to claim 1, wherein the housing further includes a support that supports the removably attachable shutter, the support being provided inside the housing.

20. A multi-core/single-core conversion module comprising:

a first unit module comprising a housing including a first end, a second end, and first and second lateral walls defining an inner space between the first end and the second end, a first adapter attached to the first end of the housing, and two or more second adapters attached to the second end of the housing;

a second unit module comprising a housing including a first end, a second end, and first and second lateral walls defining an inner space between the first end and the second end, a first adapter attached to the first end of the housing, and two or more second adapters attached to the second end of the housing;

a multi-core optical connector inserted into the first adapter of the first unit module from the inner space of the housing;

a first single-core optical connector inserted into one of the second adapters of the first unit module from the inner space of the housing of the first unit module;

a second single-core optical connector inserted into one of the second adapters of the second unit module from the inner space of the housing of the second unit module; and a plurality of optical fibers connecting the multi-core optical connector to the first and second single-core optical connectors with each other, wherein the second adapters are arranged on the second end of each unit module across a plurality of tiers, wherein the optical fiber connecting the multi-core optical connector with the second single-core optical connector with each other passes through an opening formed on the second lateral wall of the first unit module and an opening formed on the second lateral wall of the second unit module, and wherein a removably attachable shutter is configured to close an opening of each of the first lateral walls of the housings in an attached state.

21. The multi-core/single-core conversion module according to claim 20, further comprising a module coupling member having one end detachably attached to the lateral wall of the first unit module and the other end detachably attached to the lateral wall of the second unit module.

22. The multi-core/single-core conversion module according to claim 20, further comprising an adapter holder attached to the housing so as to be pivotable around an axis line crossing a tier direction of the plurality of tiers to hold the second adapter for each tier.

* * * * *